United States Patent [19]
Bopp

[11] 3,814,413
[45] June 4, 1974

[54] DEVICE FOR HOLDING AND MOVING A WORK OBJECT

[76] Inventor: Cecil W. Bopp, 2324 Ansborough Ave., Waterloo, Iowa 50701

[22] Filed: Sept. 8, 1971

[21] Appl. No.: 178,634

[52] U.S. Cl................. 269/58, 269/71, 74/481, 91/420, 251/243, 251/290
[51] Int. Cl................. B23q 3/18, F16k 31/46
[58] Field of Search................ 269/57, 58, 61, 71; 137/106; 251/242, 243, 289, 290, 295; 91/420; 74/99, 216.5, 480, 481, 509, 510, 511

[56] References Cited
UNITED STATES PATENTS

| | | | |
|---|---|---|---|
| 1,968,990 | 8/1934 | Carlson | 269/58 |
| 2,483,312 | 9/1949 | Clay | 137/106 |
| 2,685,352 | 8/1954 | Hukari | 74/216.5 |
| 2,777,426 | 1/1957 | Steele | 251/242 |
| 2,884,242 | 4/1959 | Fleming | 269/58 |
| 3,110,279 | 11/1963 | Brashear | 269/58 |
| 3,381,587 | 5/1968 | Parquet | 91/420 |
| 3,595,558 | 7/1971 | Fisher | 269/61 |

Primary Examiner—Harold D. Whitehead
Attorney, Agent, or Firm—Zarley, McKee & Thomte

[57] ABSTRACT

A device for holding and moving a work object comprising a support, an elongated elevation member hinged to the support, a work supporting head mounted on the distal end of the elevation member and adapted to rotate about a horizontal axis and a second axis perpendicular to the horizontal axis. Power means are provided for moving the elevation member upwardly and downwardly and for rotating the head about its first and second axes. Special controls are provided for controlling the elevation of the head, the tilt angle of the head, and the speed at which the head is rotating the work object. Check valves are provided in the hydraulic system for preventing the sinking of the head in response to gravitational force, for preventing the tilting of the head in response to outside forces, and for preventing the coasting of the head about its rotational axis when the means for rotating the head is deactuated.

3 Claims, 10 Drawing Figures

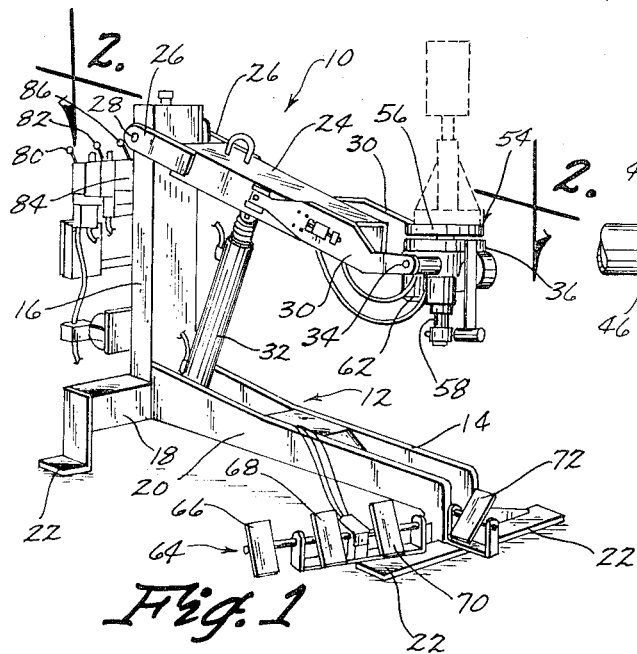
Fig. 1
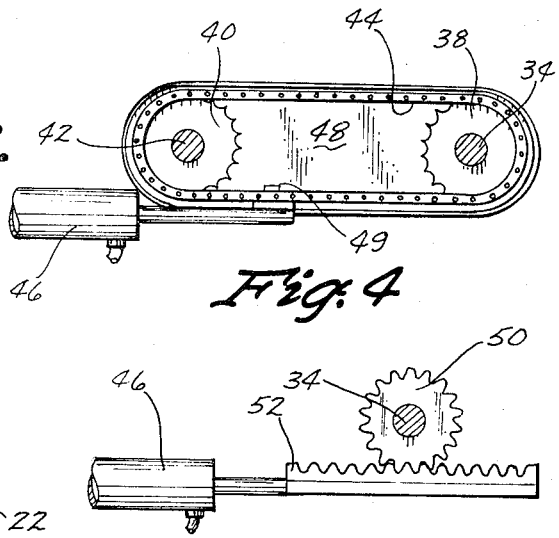
Fig. 4
Fig. 5
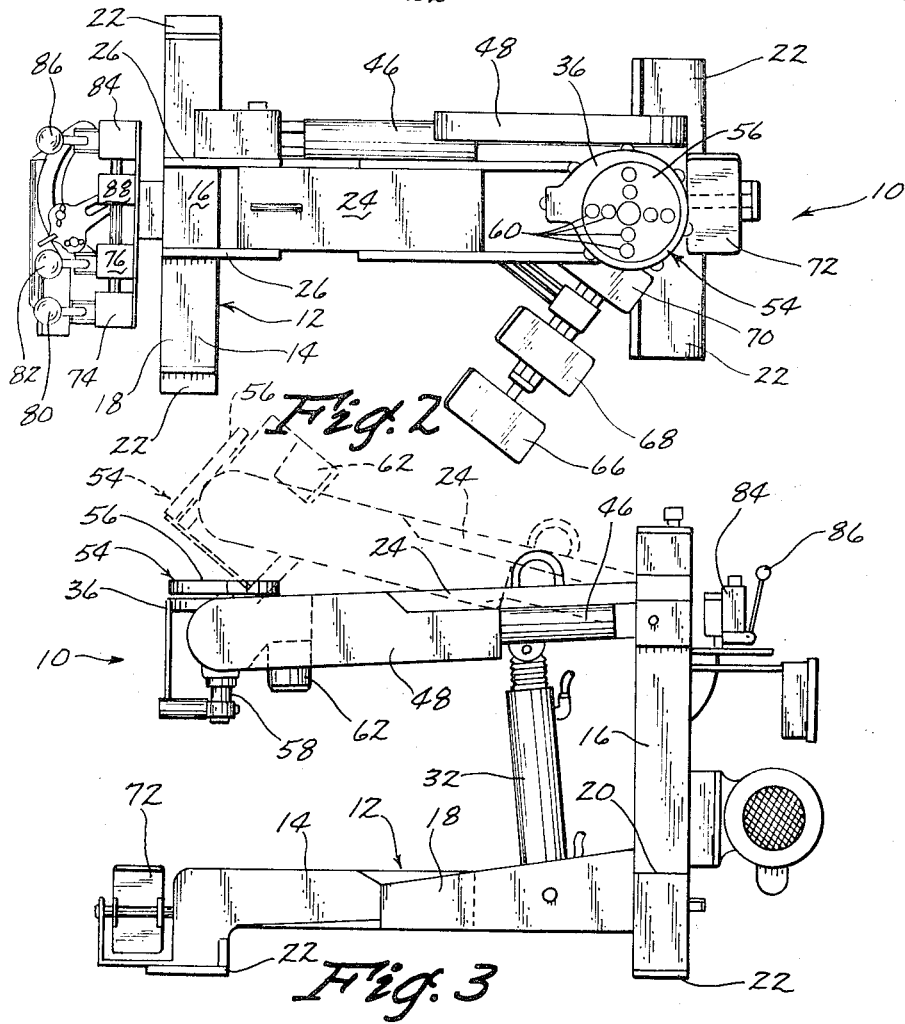
Fig. 2
Fig. 3

DEVICE FOR HOLDING AND MOVING A WORK OBJECT

This invention relates to devices for holding and moving work objects.

During welding and other operations it is desirable to have a device for holding the work object and for moving it in a slow steady pattern while the desired operations are being performed on the work object. Such a device must have positive and sturdy means for controlling the movement of the device so that it will not move beyond the desired amount, and will not move when it is desired that it be held still.

Therefore, a primary object of the present invention is the provision of a device for holding and moving a work object.

A further object of the present invention is the provision of a device for holding and moving a work object which will move the object up and down, tilt it, and rotate it at a plurality of speeds.

A further object of the present invention is the provision of a device wherein the elevation and tilt controls will not sag or fall in response to gravitational or other outside forces.

A further object of the present invention is the provision of a device wherein the rotation imparted to the work object will not continue when the operator turns off the rotational controls.

A further object of the present invention is the provision of a device which can be controlled easily by foot pedals while the operator uses his hands to perform the desired functions on the work object.

A further object of the present invention is the provision of a device which will rotate the work object at any set speed, and will continue to rotate it constantly at that predetermined speed while at the same time including override controls to speed up or slow down the rotation as desired.

A further object of the present invention is the provision of a device which is economical to manufacture, durable in use, and sturdy in construction.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the device of the present invention.

FIG. 2 is a top view taken along line 2 — 2 of FIG. 1.

FIG. 3 is a side elevational view of the device of the present invention.

FIG. 4 is a detailed view of the sprocket and chain assembly for tilting the head of the present device.

FIG. 5 is a partial view of an alternative rack and gear assembly for tilting the head of the present invention.

Figures 6, 7:
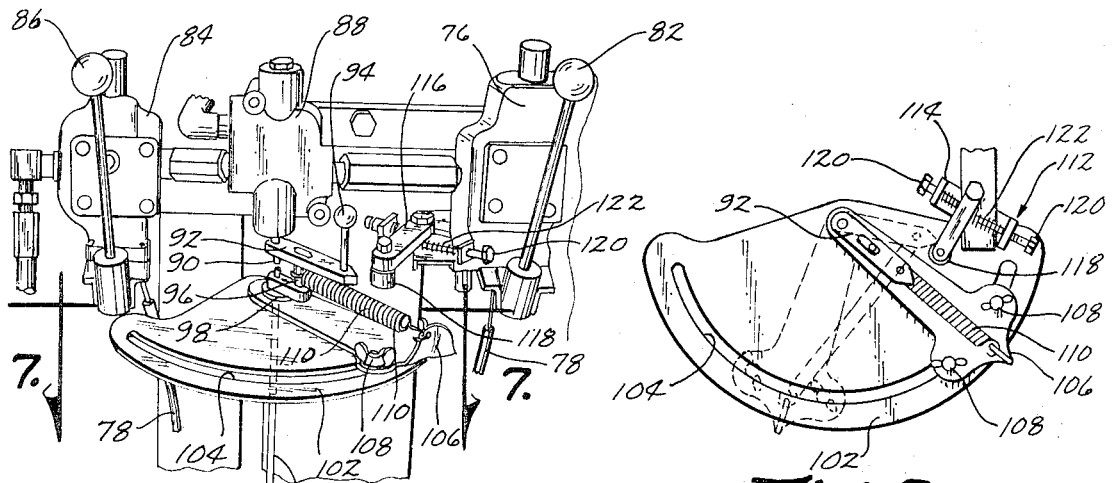
FIG. 6 is a partial perspective view of the mechanism for controlling the speed of rotation of the head of the present invention.
FIG. 7 is a sectional view taken along line 7 — 7 of FIG. 6.

Referring to the drawings the numeral 10 designates a device for holding and moving a work object.

Device 10 includes a support structure 12 having a T-shaped base 14 and a vertical post 16 rigidly upstanding therefrom. Base 14 includes a cross frame member 18 and a horizontal beam 20. A plurality of feet 22 are mounted on the opposite ends of cross frame member 18 and on the end of horizontal beam 20 for the purpose of engaging a supporting surface and supporting support structure 12 in the position shown in the drawings.

An elevation arm 24 includes a pair of hinge ears 26 extending from one of its ends. Hinge ears 26 include a hinge pin 28 extending therethrough to pivotally mount elevation arm 24 at the upper end of vertical post 16. At the other end of elevation arm 24 are a pair of spaced apart and outwardly extending head support plates 30 and elevation cylinder 32 is connected at its lower end to T-shaped base 14 and at its upper end to elevation arm 24, so that extension and retraction of cylinder 32 will cause elevation arm 24 to swing upwardly and downwardly about its hinged axis at hinge pin 28.

Pivotally mounted by pins 34 between head support plates 30 is a head member 36. Pins 34 provide a horizontal pivotal axis for head bearing member 36. Referring to FIG. 4, a sprocket 38 is rigidly mounted to pin 34 and a second sprocket 40 is rotatably mounted on the side of elevation arm 24 by means of a pin 42. A chain 44 is trained around sprockets 38, 40 and is adapted to rotate these sprockets when moved therearound. A tilt cylinder 46 is connected at one of its ends to arm 34 (or in the alternative to vertical post 16) and is connected at its opposite end to chain 44 by means of a bracket 49 on the end thereof. Thus, extension and retraction of tilt cylinder 46 causes such movement to be transferred by means of chain 44 to sprocket 38, and consequentially causes head bearing member 36 to tilt about the axis formed by pins 34. A safety guard 48 covers chain 44 and sprockets 38, 40 (FIGS. 2 - 4).

Referring to FIG. 5, an alternative apparatus is shown for tilting head bearing member 36. Instead of a sprocket 38 mounted on pin 34, a gear 50 is rigidly mounted thereon and is adapted to intermesh with a rack 52 mounted on the distal end of cylinder 46. Thus extension and retraction of cylinder 46 causes rotation of gear 50 and thereby causes tilting of head bearing member 36.

Mounted on head bearing member 36 is a head 54 having a circular supporting surface 56 and a downwardly extending neck 58 which is journaled within head bearing member 36 for rotation about a vertical axis which coincides with the longitudinal axis of neck 58. The rotational axis of head 54 about the longitudinal axis of neck 58 is perpendicular to the horizontal tilt axis of head bearing member 36 about pins 34. Support surface 56 includes a plurality of apertures 60 therein which provide a means for mounting a work object on support surface 58. Carried on head bearing member 36 is a hydraulic motor 62 which drivingly engages head 54 to cause head 54 to rotate about the longitudinal axis of neck 58. The particular drive mechanism between hydraulic motor 62 and head 54 is not shown, but it may be either a direct gear drive, or in cases requiring a more powerful gear ratio, it may be done by worm gears or other means providing the desired result.

A foot pedal control mechanism 64 rests on the floor or other surface which supports device 10 and includes an elevation control pedal 66, a rotation direction control pedal 68, a tilt control pedal 70, and a rotation speed control pedal 72. ElevatiOn pedal 66 and tilt pedal 70 are connected to an elevation control valve 74 (FIG. 2) and a tilt control valve 76 respectively by means of cables 78 (FIG. 6). Elevation control valve 74 and tilt control valve 76 are adapted to reverse the flow of hydraulic fluid in the circuit to be described hereinafter in response to movement of cables 78 which are actuated by pedals 66, 70. Associated with elevation control valve 74 and tilt control valve 76 are a pair of override levers 80, 82 respectively which can be used to override cables 78 to actuate valves 74, 76 for reversing the flow of hydraulic fluid in the circuit. Levers 80, 82 are spring centered, and if moved forward cause the fluid to flow one direction in the circuit while if moved backward they cause the fluid to move in the opposite direction.

Rotation direction control pedal 68 is connected by means of a cable 78, to a rotation control valve 84 (FIGS. 1, 2, 6 and 10). Valve 84 is adapted to reverse the flow in the hydraulic circuit to hydraulic motor 62. Associated with valve 84 is an override lever 86 which is similar to levers 80, 82 except that it is not spring centered. When in its center position lever 86 stops all flow of fluid to motor 62. When lever 86 is moved forwardly it causes the fluid to flow in one direction and when it is moved rearwardly it cause the fluid to move in the opposite direction.

Figure 10:
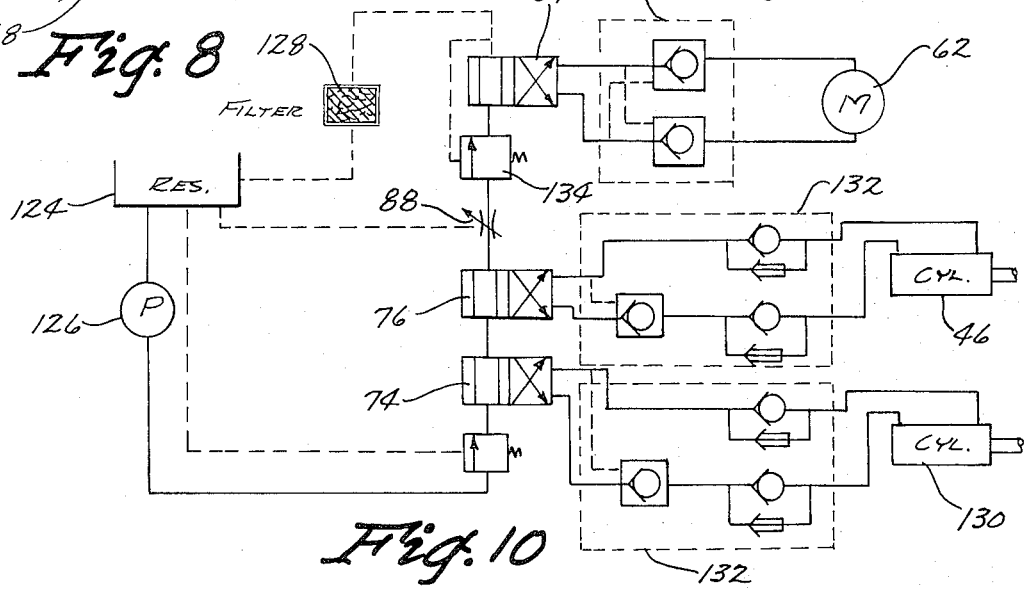
FIG. 10 is a schematic diagram of the hydraulic circuitry of the present invention.

Connected in series with valve 84 is a flow divider 88 FIGS. 2, 6 and 10) which is adapted to control the rate of fluid introduced to valve 84 and thereby controls the speed at which motor 62 operates. Referring to FIG. 6, a speed control shaft 90 extends downwardly from flow divider 88. Rotation of shaft 90 causes flow divider 88 to vary the speed at which fluid is introduced to valve 84. Extending radially outwardly from shaft 90 is an arm 92 having a handle 94 thereon for permitting manual manipulation of shaft 90. Extending downwardly from arm 92 which is coupled by means of a second arm 98 to a vertical shaft 100 wihch is in vertical alignment with shaft 90. Thus rotation of shaft 100 causes rotation of shaft 90 by means of its coupled connection thereto through pin 96. Shaft 100 is operatively coupled to rotation speed control pedal 72 and is adapted to be rotated thereby when pedal 72 is depressed or otherwise manipulated by the operator's foot.

An anchor plate 102 is rigidly mounted to support structure 12 and includes an arcuate slot 104 therein which is concentric with respect to the longitudinal axes of shafts 90, 100. A swing arm 106 is pivotally mounted on the upper surface of anchor plate 102 with one of its ends being pivotally mounted for rotation about the longitudinal axes of shaft 90, 100. A bolt and wing nut 108 extend through arcuate slot 104 and provide a means for detachably securing swing arm 106 in any desired position along arcuate slot 104. an elongated coil spring 110 is connected at one of its ends to the outer radial end of swing arm 106 and is connected at the other of its ends to pin 96. Coil spring 110 thus urges arms 92, 98 into a position wherein they are in substantial alignment with the longitudinal axis of spring 110. Depression of pedal 72, however, will move arms 92, 98 out of this position against the bias of spring 110, but when the operator removes his foot from pedal 72 spring 110 will return arms 92, 96 to their original position in alignment with the longitudinal axis of spring 110. Thus, swing arm 106 and spring 110 provide a means for setting the normal speed at which motor 62 operates. This normal speed may be varied merely by releasing wing nut 108 and rotating swing arm 106 to a different position along arcuate slot 104.

Rigidly mounted to support structure 12 is a catch mechanism 112 having a catch bracket 114 to which is pivotally mounted a catch arm 116 having a catch roller 118 on its outer end. A pair of adjustment bolts 120 are threadably mounted to bracket 114 and include adjustment springs 122 which engage the opposite sides of catch arm 116 so as to yieldably hold catch arm 116 in a predetermined position. As can be seen in FIG. 7, the purpose of catch arm 116 is to provide a means for catching arm 92 and yieldably holding arm 92 in its extreme counterclockwise position. This position would normally be in the off position of flow divider 88 so that motor 62 does not receive any hydraulic fluid. Arm 92 may be moved to this position either manually by means of handle 94 or by depression of pedal 72. Likewise, the spring mounting of spring arm 92 permits easy release from this position by means of handle 94 or pedal 72.

Referring to FIG. 10, the hydraulic circuitry of the present invention includes a fluid reservoir 124, a hydraulic pump 126 and a filter 128. Fluid is pumped from reservoir 126 toward elevation control valve 74, and passes through a master valve 130 immediately prior to entering valve 74. Elevation control valve 74 includes a circuit to elevation cylinder 32, the circuit including a cylinder flow regulator 132 which will be described in more detail hereinafter. Connected in series with valve 74 is tilt control valve 76 which includes a separate circuit to tilt cylinder 46, the circuit having a cylinder flow regulator 132 identical to that in the circuit for elevation control cylinder 32. Between tilt control valve 76 and rotation control valve 84 are flow divider 88 (described above) and an additional master valve 134. Hydraulic motor 62 is connected in a separate circuit with rotation control valve 84, and this circuit includes a motor flow regulator 136 which will be described hereinafter.

Cylinder flow regulator 132 has the purpose of preventing sinking or sagging of either elevation cylinder 32 or tilt cylinder 46 in response to gravity or other outside forces. It includes a first passageway 138 which extends therethrough following the path indicated by arrows 140. Passageway 138 includes a reservoir end 142 oriented in the direction within the circuit of reservoir 124, and includes a cylinder end 146 oriented towards cylinder 32 in the hydraulic circuit. Intermediate the ends of first passageway 138 is a one-way valve 148 which is adapted to permit flow of fluid from reservoir end 142 toward cylinder end 146, but which prevents flow of fluid from cylinder end 146 toward reservoir end 142. A bypass passageway 150 provides communication with first passageway 138 at opposite sides of one-way valve 148. Located within bypass passageway 150 is a needle valve 152 which may be used to adjust the rate of flow through bypass passageway 150. Thus, even though valve 148 prevents flow of fluid toward reservoir end 142, bypass passageway 150 permits limited control of fluid passing in that direction.

A second passageway 154 extends through cylinder flow regulator 132. It commences at a reservoir end 156, upwardly through a diagonal portion 158 past a first check valve 160, past a second check valve 162, to a cylinder end 164. Check valves 160, 162 prevent the flow of fluid from cylinder end 164 toward reservoir end 156 of second passageway 154. A bypass passageway 166 provides communication with passageway 154 on opposite sides of second check valve 162, thereby permitting a limited flow of fluid around this check valve. A needle valve 168 is provided in bypass passageway 166 for controlling this flow of fluid. First check valve 160 is engaged by a valve pin 170 which slidably extends into a pressure sensing chamber 172 which is within cylinder flow regulator 132. Valve pin 170 is engaged by a pressure sensing piston 174 which is slidably within pressure sensing chamber 172 and which includes a sealing ring sealing its engagement with the walls of pressure sensing chamber 172. At the extreme right end (as viewed in FIG. 8) of pressure sensing chamber 172 is a pressure sensing port 176 which provides communication between chamber 172 and first passageway 138.

In operation when fluid is moving in the direction indicated by arrows 140 it passes through first passageway 138 without restriction and goes to cylinder 32. Check valves 160, 162, however, prevent this fluid from continuing to the reservoir end 156 of second passageway 154. Consequently, pressure builds within first passageway 138. This pressure is transferred into pressure sensing chamber 172 and causes movement of cylinder 174 to the left as viewed in FIG. 8. This causes pin 170 to move valve 160 to an open position wherein fluid is free to pass through second passageway 154 and outwardly through reservoir end 156 thereof. As soon as the introduction of fluid to cylinder 130 is cut off, the pressure within first passageway 138 subsides, and valve 160 forces pin 170 and piston 174 to the right, as viewed in FIG. 8. Thus, valve 160 closes and prevents the removal of fluid from cylinder 32. Thus, the weight of gravity or other forces acting on cylinder 32 do not cause movement thereof because check valve 160 holds cylinder 32 tightly in place.

When it is desired to move cylinder 32 in the opposite direction, valve 74 is actuated to reverse the fluid flow so that it will flow in the opposite direction from that indicated by arrows 140. Thus, fluid will flow freely through second passageway 154 toward cylinder 32. Check valve 148 prevents flow of fluid toward reservoir end 142 of first passageway 138, but bypass passageway 150 permits a limited flow of fluid in this direction. The directional flow of fluid as indicated by arrows 140 is for the purpose of raising elevation arm 24, and the opposite flow of fluid is for the purpose of lowering arm 24.

Figures 8, 9:
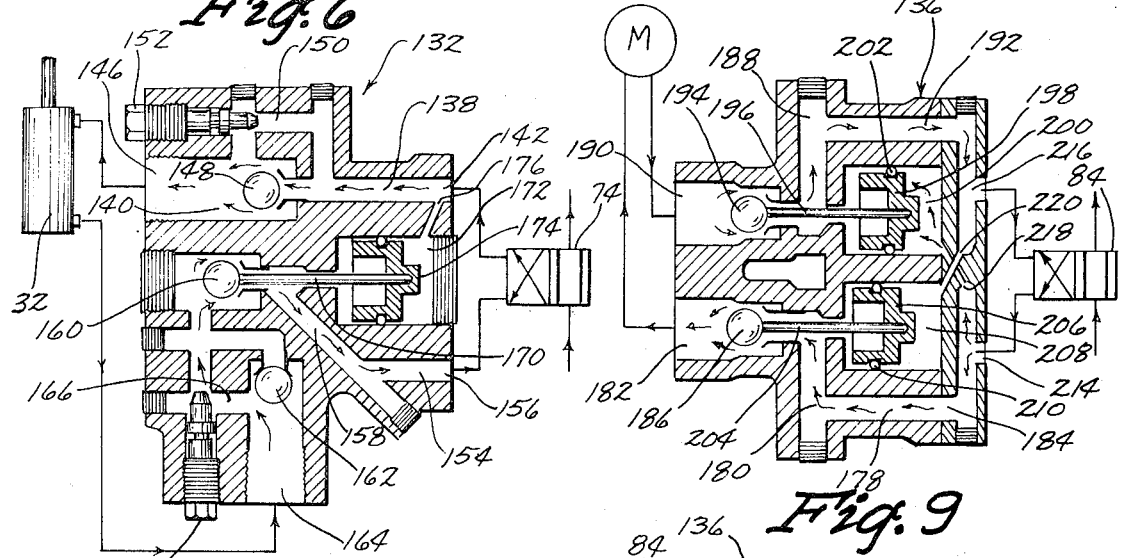
FIG. 8 is a sectional view of the cylinder flow regulator used in the present invention.
FIG. 9 is a sectional view of the motor flow regulator used in the present invention.

Referring to FIG. 9, motor flow regulator 136 is connected to motor 62 for the purpose of preventing coasting of the motor when fluid flow is cut off therefrom. Regulator 136 includes a first passageway 178 which follows the path indicated by arrows 180 and which incudes a motor end 182 and a reservoir end 184. Interposed between ends 182, 184 is one-way check valve 186 which prevents flow of fluid from end 182 towards end 184, but which permits free flow of fluid in the opposite direction. A second passageway 188 includes a motor end 190 and a reservoir end 192. Interposed between ends 190, 192 is a one-way check valve 19 which prevents the flow of fluid from end 190 toward end 192, but which permits the free flow of fluid in the opposite direction. Valve 194 is connected to a valve pin 196 which in turn is connected to a pressure sensing piston 198 slidably mounted within a pressure sensing chamber 200 and which includes a sealing ring 202 annularly extending therearound. Valve 186 is connected to a valve pin 204 which in turn is connected to a pressure sensing piston 206 slidably mounted within a pressure sensing chamber 208 and having a sealing ring 210 extending therearound.

An oil transfer plate 212 is mounted over reservoir ends 184, 192 of first and second passageways 178, 188 respectively. Plate 212 includes a first opening 214 which is in communication with reservoir end 184 of first passageway 178, and additionally includes a second opening 216 which is in communication with reservoir end 192 of second passageway 188. A first pressure sensing bore 218 provides communication between first inlet opening 214 and pressure sensing chamber 200, and a second pressure sensing bore 220 provides communication between second inlet opening 216 and pressure sensing chamber 208.

In opeation fluid may be introduced either to inlet opening 214 or inlet opening 216 by rotation control valve 84. If the fluid is introduced to inlet opening 214 it progresses through first passageway 178 in the direction indicated by arrows 180. It then passes through motor 62 and returns to cylinder end 190 of second passageway 188. Check valve 194 prevents the passage of fluid through second passageway 188, and therefore a pressure builds and backs up into first passageway 178. This pressure is transferred by means of pressure sensing port 218 into pressure sensing chamber 200 and therefore causes pressure sensing cylinder 198 to move valve 194 to its open position. Thus fluid is permitted then to flow from motor end 190 toward reservoir end 192 of second passageway 200. When the flow of fluid is cut off, the pressure within first passageway 178 subsides, and the result is that the pressure within pressure sensing chamber 200 also subsides thereby causing valve 194 to move to its closed position. Thus, motor 62 is not free to caost after the fluid flow is cut off therefrom. When valve 84 is reversed so that the flow of fluid is in the opposite direction from that described above, the exact opposite result is obtained. Check valve 186 prevents fluid from passing from motor end 182 toward reservoir end 814, thereby causing pressure to build within second passageway 188 and pressure sensing chamber 208, and consequently valve 186 is moved to its open position. When the flow of fluid is cut off the pressure subsides within second passageway 188 and consequently within pressure sensing chamber 208 and valve 186 moves to its closed position, thereby preventing coasting of motor 62.

Thus it can be seen that the device accomplishes at least all of its stated objectives.

I claim:

1. A device for holding and moving a work object comprising;

a support;

an elongated elevation member movably mounted on said support, said elevation member having a first end which is movable upwardly and downwardly with respect to said support;

a head mounted on said elevation member adjacent said first end thereof for upward and downward movement therewith;

said head being pivotally mounted to said elevation member for pivotal movement about a first horizontal axis and being adapted to rotate about a second axis perpendicular to said first axis;

attachment means on said head for detachably securing a work object thereon;

power means for moving said elevation member with respect to said support and for moving said head about said first and second axes;

said power means including a variable speed motor for rotating said head about said second axis; said motor having a speed control member movable through a plurality of positions for causing said motor to rotate said head at a plurality of speeds; a speed governor being attached to said speed control member for yieldably holding said speed control member in a preselected position, a manually operated override mechanism being connected to said speed control member for manually moving said speed control member against the bias of said governor.

2. A device according to claim 1 wherein said speed control member is a lever which swings about a pivot point adjacent one of its ends; said governor having an elongated coil spring having a first end pivotally connected to said lever and having a second end located radially outwardly from said first end with respect to said pivot point; anchor means being connected to said second end of said spring for causing said spring to yieldably urge said lever into alignment with the longitudinal axis of said spring.

3. A device according to claim 2 wherein said anchor means includes swing member connected to said second end of said spring and being movably in an arc concentric to said pivot point of said lever, releasable securing means being associated with said swing member for permitting selective fastening of said swing member in any of a plurality of positions along said arc whereby said spring will urge said lever into a different position for each different position of said swing member.

* * * * *